United States Patent
Kargl et al.

(10) Patent No.: US 9,787,137 B2
(45) Date of Patent: Oct. 10, 2017

(54) POWER SUPPLY APPARATUS FOR PROVIDING A VOLTAGE FROM AN ELECTROMAGNETIC FIELD

(71) Applicant: Infineon Technologies AG, Neubiberg (DE)

(72) Inventors: Walter Kargl, Graz (AT); Helmut Koroschetz, Lieboch (AT); Albert Missoni, Graz (AT)

(73) Assignee: Infineon Technologies AG, Neubiberg (DE)

( * ) Notice: Subject to any disclaimer, the term of this patent is extended or adjusted under 35 U.S.C. 154(b) by 389 days.

(21) Appl. No.: 13/778,268

(22) Filed: Feb. 27, 2013

(65) Prior Publication Data

US 2013/0234528 A1    Sep. 12, 2013

(30) Foreign Application Priority Data

Mar. 9, 2012 (DE) .................. 10 2012 102 007

(51) Int. Cl.
  *H02J 17/00* (2006.01)
  *H02J 5/00* (2016.01)
  *H02J 7/02* (2016.01)
  *H02J 7/34* (2006.01)

(52) U.S. Cl.
  CPC .............. *H02J 17/00* (2013.01); *H02J 5/005* (2013.01); *H02J 7/025* (2013.01); *H02J 7/345* (2013.01)

(58) Field of Classification Search
  CPC . H02J 5/005; H02J 7/025; H02J 7/345; H01F 38/00
  See application file for complete search history.

(56) References Cited

U.S. PATENT DOCUMENTS

| 5,221,349 | A | * | 6/1993 | Tamagaki | C23C 14/325 118/708 |
| 5,450,305 | A |   | 9/1995 | Boys et al. | |
| 6,323,728 | B1 |   | 11/2001 | Schmitt-Landsiedel et al. | |
| 6,384,667 | B1 | * | 5/2002 | Bouvier | 327/535 |
| 6,809,952 | B2 | * | 10/2004 | Masui | G06K 7/0008 365/145 |

(Continued)

FOREIGN PATENT DOCUMENTS

| CN | 102460520 A | 5/2012 |
| DE | 10158195 A1 | 6/2003 |

(Continued)

OTHER PUBLICATIONS

English abstract of DE10348569A1; May 25, 2005.
English abstract of EP0877333; Nov. 10, 2004.

*Primary Examiner* — Thienvu Tran
*Assistant Examiner* — Pinping Sun
(74) *Attorney, Agent, or Firm* — Viering, Jentschura & Partner mbB

(57) ABSTRACT

Different exemplary embodiments provide a power supply apparatus for providing a voltage from an electromagnetic field, which apparatus has a conversion device which is set up to derive a voltage from a wirelessly received electromagnetic field, and a decoupling device which is coupled to the conversion device and has a first connection and a second connection, at each of which a supply voltage is provided, the decoupling device suppressing an effect of the circuits coupled to the first and second connections on the power supply apparatus.

14 Claims, 3 Drawing Sheets

(56) References Cited

U.S. PATENT DOCUMENTS

| | | | |
|---|---|---|---|
| 7,156,314 B2* | 1/2007 | Kargl | G06K 19/07769 235/451 |
| 8,078,225 B2* | 12/2011 | Kargl et al. | 455/558 |
| 8,322,624 B2* | 12/2012 | Finn | 235/492 |
| 8,358,232 B2* | 1/2013 | Finkenzeller et al. | 341/176 |
| 8,453,939 B2* | 6/2013 | Lee | G06K 19/07733 235/375 |
| 8,539,990 B2* | 9/2013 | Ferguson et al. | 141/94 |
| 8,796,887 B2* | 8/2014 | Von Novak et al. | 307/104 |
| 2001/0007815 A1 | 7/2001 | Philipsson | |
| 2008/0087723 A1* | 4/2008 | Kargl | H04B 5/00 235/380 |
| 2009/0067208 A1* | 3/2009 | Martin | H02J 17/00 363/126 |
| 2009/0073070 A1* | 3/2009 | Rofougaran | H04B 5/0012 343/793 |
| 2009/0127934 A1* | 5/2009 | Sbuell | G06K 19/0723 307/66 |
| 2009/0128354 A1* | 5/2009 | Sbuell et al. | 340/693.4 |
| 2010/0190436 A1* | 7/2010 | Cook | H04B 5/00 455/41.1 |
| 2010/0279606 A1* | 11/2010 | Hillan | H04B 5/00 455/41.1 |
| 2010/0314444 A1* | 12/2010 | Sbuell | H01Q 1/2225 235/439 |
| 2011/0080152 A1* | 4/2011 | Luzzi | G06K 19/0723 323/299 |
| 2011/0241614 A1* | 10/2011 | Yeh | 320/108 |
| 2011/0304216 A1* | 12/2011 | Baarman | 307/104 |
| 2012/0038220 A1* | 2/2012 | Kim | H02J 7/025 307/104 |
| 2012/0149301 A1* | 6/2012 | Wiley | 455/41.1 |
| 2012/0217926 A1* | 8/2012 | Yoon et al. | 320/108 |
| 2012/0235636 A1* | 9/2012 | Partovi | H02J 7/025 320/108 |

FOREIGN PATENT DOCUMENTS

| | | |
|---|---|---|
| DE | 10348569 A1 | 5/2005 |
| DE | 102007010896 A1 | 9/2008 |
| DE | 102010028926 A1 | 11/2011 |
| EP | 0877333 B1 | 11/2004 |
| WO | 9945499 A1 | 9/1999 |
| WO | 03052684 A1 | 6/2003 |
| WO | 2010128442 A2 | 11/2010 |
| WO | 2011141232 A1 | 11/2011 |

* cited by examiner

POWER SUPPLY APPARATUS FOR PROVIDING A VOLTAGE FROM AN ELECTROMAGNETIC FIELD

CROSS-REFERENCE TO RELATED APPLICATION

This application claims priority to German Patent Application Serial No. 10 2012 102 007.8, which was filed Mar. 9, 2012, and is incorporated herein by reference in its entirety.

BACKGROUND

The present invention relates generally to a power supply apparatus for providing a voltage from an electromagnetic field.

In apparatuses which obtain their energy from a contactless magnetic field which is simultaneously used for communication, a current produced in the apparatuses or a voltage produced in the latter may pass to the communication interface as noise and may impair contactless communication in this manner. Such a scenario may arise, for example, in chip cards which, in addition to an integrated circuit as the main circuit, may have further functional circuits, for instance a display panel. The operation of the display panel may produce current and/or voltage noise and may act on the main circuit and/or the communication interface of the chip card, with the result that data communication between the chip card and a reader may be impaired.

SUMMARY OF THE INVENTION

The invention provides a power supply apparatus for providing a voltage from an electromagnetic field, which apparatus has a conversion device which is set up to derive a voltage from a wirelessly received electromagnetic field, and a decoupling device which is coupled to the conversion device and has a first connection and a second connection, at each of which a supply voltage is provided, the decoupling device suppressing an effect of the circuits coupled to the first and second connections on the power supply apparatus.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
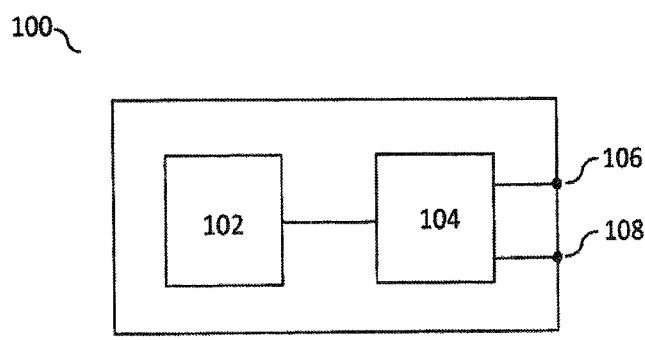
FIG. 1 shows a power supply apparatus according to different exemplary embodiments.

FIG. 1 illustrates a power supply apparatus 100 for providing a voltage from an electromagnetic field. The power supply apparatus 100 has a conversion device 102 which is set up to derive a voltage, for example a DC voltage, from a wirelessly received electromagnetic field. The conversion device 102 may have an input (not illustrated in FIG. 1) which is coupled to the input of the power supply apparatus 100 (not illustrated in FIG. 1). The conversion device 102 may be substantially set up to rectify an AC voltage (or an alternating current) which can be provided at its input. The power supply apparatus 100 also has a decoupling device 104 which is coupled to the conversion device 102 and has a first connection 106 and a second connection 108, at each of which a supply voltage is provided. The decoupling device 104 is set up to suppress an effect of the circuits coupled to the first connection 106 and to the second connection 108 on the power supply apparatus 100 and on circuits connected upstream of the latter. The connections 106, 108 of the conversion device 104 may be simultaneously connections or outputs of the power supply apparatus 100 according to different exemplary embodiments. In other words, the power supply apparatus 100 may be considered to be a unidirectional coupler which allows a flow of energy from its input to the first connection 106 and to the second connection 108 and blocks a reverse flow of energy or attenuates it to such a large extent that it does not influence the operation of circuits connected upstream of the power supply apparatus 100.

The power supply apparatus may have an input which may be coupled, for example, to a communication interface of a receiving apparatus and/or of a transmitting device, for instance an antenna. The receiving apparatus may be set up to couple to an electromagnetic field of a reader and to supply the energy contained in the field to the power supply apparatus, for example in the form of an AC voltage or an alternating current which may be induced in the receiving apparatus by the electromagnetic field. The power supply apparatus may be set up in such a manner that it provides, at the first and second connections, a DC voltage which is derived from the electromagnetic field and can be supplied to a first circuit or a second circuit. In different exemplary embodiments, the suppression of the (electromagnetic) effect of the circuits coupled to the first and second connections on the power supply apparatus may be understood as meaning that the decoupling device respectively constitutes a unidirectional supply path to the first and second circuits.

Energy may be supplied to the first circuit and/or to the second circuit, but possible voltages or currents which could have an effect on the power supply apparatus according to different exemplary embodiments from the circuits via the supply paths (for example by being superimposed on the voltages or currents correctly prevailing in the power supply apparatus) are suppressed, for example are attenuated to such a large extent that they have no influence on the operation of the power supply apparatus or circuits connected upstream of the latter. In different exemplary embodiments, the first and second circuits may be understood as meaning any desired circuit arrangements which may be present in integrated or hard-wired form. The second circuit may also have functional components and/or component groups, such as sensors, actuators and/or displays.

According to further exemplary embodiments, the power supply apparatus may also have a receiving apparatus which is set up to couple to an electromagnetic field.

According to further exemplary embodiments of the power supply apparatus, the receiving apparatus may also be set up to provide data communication. For this purpose, the power supply apparatus may have a communication interface, for example, or may be coupled to the latter, which communication interface is coupled to the receiving apparatus and to the conversion device and is set up to convert the voltages or currents induced in the receiving apparatus by the electromagnetic field into corresponding signals and vice versa. The receiving apparatus which may be in the form of an antenna in the form of a coil winding or one or more conductor loops may have additional electronic components such as coils or capacitors, with the result that the resonant frequency of the receiving apparatus can be tuned to the frequency of the electromagnetic field to which the receiving apparatus is intended to couple. It goes without saying that the receiving apparatus may simultaneously act as a transmitting device, with the result that data can be both received and transmitted via the communication interface as a bidirectional communication interface.

According to further exemplary embodiments of the power supply apparatus, the electromagnetic field may be a wireless communication field. The wireless communication field may be any desired standardized or non-standardized, licensed or unlicensed communication field, for instance an NFC (Near Field Communication) field, a Bluetooth field, an RFID (Radio-Frequency Identification—identification with the aid of electromagnetic waves) field or an infrared field. The wireless communication field may, in principle, be an electromagnetic field of any desired wavelength, with at least one parameter, for example frequency or amplitude, being modulated in an expedient manner, such that information can be transmitted using the electromagnetic field.

According to further exemplary embodiments of the power supply apparatus, the conversion device may have a rectifier. The rectifier can be used to convert the AC voltage (or alternating current) induced in the receiving apparatus into a DC voltage (or direct current). The rectifier may have at least one diode and may be set up, for example, as a half-wave rectifier, a midpoint rectifier or a bridge rectifier.

According to further exemplary embodiments of the power supply apparatus, the decoupling device may have a DC source which is operated in saturation. For example, the DC source may have a MOSFET (metal-oxide semiconductor field effect transistor) which is operated in saturation and has a drain-to-source voltage of at least 0.5 V. The saturation region of a MOSFET is generally characterized by the fact that a significant increase in the drain-to-source voltage does not cause a rise or causes only a very slight rise in the drain-to-source current (in particular in comparison with an equally severe increase in the drain-to-source voltage at lower absolute drain-to-source voltages). In different exemplary embodiments, the decoupling device may be implemented by virtue of the fact that a backup capacitance is provided, which capacitance is charged, then is electrically disconnected from the input (for example by means of corresponding switches (switch transistor(s)) and is connected to the load (in other words the output) (for example also by means of corresponding switches (switch transistor(s)), and, after the load has discharged the required charge from the backup capacitance, the charge still remaining in the backup capacitance can be completely discharged or discharged to a predefined voltage level and can then be charged to the predefined level again by again being coupled to the input. In this manner, a predefined charge budget is therefore also charged and made available to the load irrespective of the actual charge consumption of the load (as long as the load does not require more charge than can be provided by the backup capacitance). Further exemplary embodiments may also provide for provided current to be discharged (clearly destroyed) by means of a current destruction circuit if no load is operated and, if a load is connected, for the current destruction circuit to be operated in such a manner that less current is discharged to the extent that current is removed from the load.

According to further exemplary embodiments of the power supply apparatus, the decoupling device may be set up to respectively provide a constant and load-independent voltage and/or a constant and load-independent current at the first connection and/or at the second connection. These voltages may be smaller than the voltage induced in the receiving apparatus by the electromagnetic field, for example if stabilization and/or regulating circuits are provided in the power supply apparatus and stabilize the voltages provided at the first connection and/or at the second connection and/or regulate said voltages to a reference value.

Different exemplary embodiments provide a chip card having a power supply device according to different exemplary embodiments.

The chip card, which is also referred to as a smart card or an ICC (integrated chip card), may be, for example, a chip card compliant with the ISO/IEC 7810 standard and/or the ISO/IEC 7816 standard.

The chip card according to different exemplary embodiments may also have a chip card module and a chip arranged on the latter, that is to say an integrated or hard-wired circuit which may contain logic and memory circuits (or blocks) and substantially determines the range of functions of the chip card. The chip card according to different exemplary embodiments may have any of the conventional size formats ID-1, ID-2, ID-3, ID-000 (also called mini-SIM format, SIM: Subscriber Identity Module) or 3FF (also called micro-SIM format); however, it may also be present in other expedient formats which are not standardized, with the result that it takes into account dimensions, for example, as boundary parameters of its use environment. Depending on the size of the chip card according to different exemplary embodiments, it may also have more than one chip card module. For example, two chip card modules may be arranged on a chip card, with the result that one of the ends of the chip card can be inserted into a reader or the chip card can be pulled through such a reader and the user can therefore select which chip card module is intended to be used. The chip card body of the chip card according to different exemplary embodiments may have conventional materials used to produce chip cards, such as PVC (polyvinyl chloride), ABS (acrylonitrile butadiene styrene), PC (polycarbonate), PET (polyethylene terephthalate) or mixtures thereof.

According to further exemplary embodiments, the chip card may be set up as a contactless chip card. According to different exemplary embodiments, this may be understood as meaning that the chip card can communicate with a reading apparatus without contact points by means of an electromagnetic (for example substantially a magnetic) communication field. It goes without saying that the chip card may also have contact points as an interface for contact-based communication, with the result that it can also communicate in a contact-based manner if necessary. The contact points may be present, for example, in the form of a subdivided contact area on the surface of the chip card, the position and shape of the subdivided contact area being able to be predefined, for example, by the ISO/IEC 7816-2 standard.

According to further exemplary embodiments of the chip card, the receiving apparatus may be set up as a chip card antenna. The chip card antenna may form part of the wireless communication interface. Bidirectional data interchange between the chip card according to different exemplary embodiments and a reading apparatus may additionally take place by means of the chip card antenna in order to supply energy.

According to further exemplary embodiments of the chip card, a chip-card-internal circuit may be coupled to the first connection. The chip-card-internal circuit may be understood as meaning the circuit arrangement or group of circuits on the chip card module, for instance the chip together with further logic and memory modules.

According to further exemplary embodiments of the chip card, the chip-card-internal circuit may have a microprocessor or microcontroller. The microprocessor or microcontroller may be in the form of an integrated circuit or a hard-wired circuit arrangement having discrete analog and/or digital components. Alternatively, the microprocessor or microcontroller may also be provided as a soft core and may be implemented, for example, on an FPGA (field programmable gate array).

According to further exemplary embodiments of the chip card, a chip-card-external circuit may be coupled to the second connection. A chip-card-external circuit may be understood as meaning any desired circuit which is not included in the chip-card-internal circuit. The chip-card-external circuit may thus be a circuit which is physically separate from the chip card, is coupled to the second connection and can be supplied with voltage or current. However, the chip-card-external circuit may also be located in the chip card, but then also does not belong to the chip-card-internal circuit and may be arranged outside the chip card module (for example in a further layer which is laminated between the chip card surfaces). For example, the chip-card-external circuit may have a tactile sensor and/or a display together with corresponding drive logic.

According to further exemplary embodiments, the chip card may also have a communication interface which is coupled to the chip card antenna. The communication interface may be set up to provide bidirectional data interchange between the chip card and a reading apparatus.

According to further exemplary embodiments of the chip card, the chip-card-external circuit and the chip-card-internal circuit may be set up to communicate with a reading apparatus by means of the communication interface. In this case, communication may be effected in encrypted or unencrypted form.

According to further exemplary embodiments of the chip card, the chip-card-external circuit may have a display. The display may be a flexible display (that is to say can be bent while retaining its functionality) which is formed, for example, on the basis of OLEDs (organic light emitting diodes) or an LCD (liquid crystal display). The display may be used by the chip-card-internal circuit and/or the chip-card-external circuit to display information.

According to further exemplary embodiments of the chip card, the display may be touch-sensitive. The touch-sensitive display may act as a user interface and may be set up to receive user inputs and to forward the latter to the first circuit and/or to the second circuit. The touch-sensitive display may also have a region which is able to recognize a fingerprint, but this functionality may also be provided separately by a fingerprint sensor set up for this purpose.

According to further exemplary embodiments of the chip card, the reading apparatus may have a mobile radio device. In such a case, the mobile radio device may have a corresponding transmitting and receiving apparatus which is set up to generate a wireless communication field by means of which the mobile radio device can communicate with the chip card.

According to further exemplary embodiments of the chip card, the reading apparatus may have a payment terminal In different exemplary embodiments, a payment terminal may be understood as meaning a terminal at which a financial transaction, for example for the purposes of paying for an item received, can be carried out in a cashless manner and/or at which a customer can withdraw or deposit cash.

According to further exemplary embodiments of the chip card, the chip-card-external circuit may have an actuator. The actuator may be electrically operated and may convert electronic signals (for example the signals produced by the first circuit and/or second circuit) into mechanical movement or other physical variables (for example pressure). The chip card according to different embodiments may be installed in a device, for example, and, as soon as its distance from a reading or communication apparatus, for example a mobile radio device, falls below a limit value, a sufficiently high voltage can be derived from the electromagnetic current of the reading apparatus, such that the chip card according to different embodiments is fully functional and sufficient energy can also be made available to the actuator for its operation.

According to further exemplary embodiments of the chip card, the electric actuator may have an electric motor which is set up to control a state of a lock.

Figure 2:
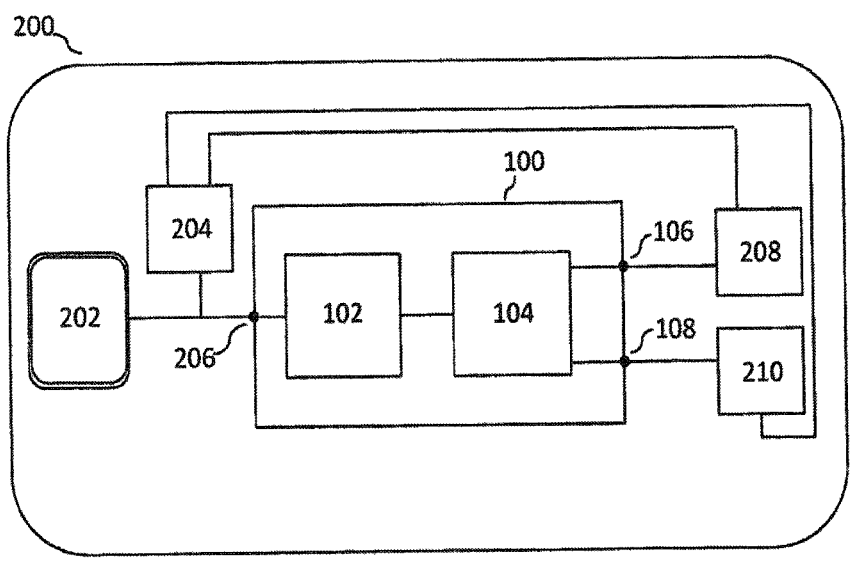
FIG. 2 shows a chip card according to different exemplary embodiments.

FIG. 2 illustrates a chip card 200 according to different exemplary embodiments. The chip card 200 has a receiving and transmitting apparatus in the form of a chip card antenna 202. The chip card antenna 202 is coupled to a communication interface 204 and to an input 206 of the power supply apparatus 100. The structure of the power supply apparatus 100 according to different examples has already been illustrated using FIG. 1 and is not described again. A first circuit 208 is coupled to the first connection 106 of the power supply apparatus 100, and the second circuit 210 is coupled to the second connection 108. The power supply apparatus 100 provides a first voltage for the first circuit at the first connection 108, this voltage being able to be constant and load-independent. In the same manner, the power supply apparatus 100 provides a second voltage for the second circuit at the second connection 108, this voltage being able to be constant and load-independent. The first voltage for the first circuit may be independent of the second voltage for the second circuit, with the result that the first voltage may be different from the second voltage and the first voltage can be kept at a constant value independently of the second voltage. Both the first circuit 208 and the second circuit 210 are linked to the communication interface 204, with the result that the circuits can communicate in a bidirectional manner with a reading apparatus independently of one another by means of the communication interface 204 and the chip card antenna 202. The power supply apparatus 100 isolates the first circuit 208 and the second circuit 210 from the chip card antenna 202 insofar as the voltages and currents possibly produced in the circuits, for example transient voltages and currents and/or voltage and current spikes, are prevented from passing to the antenna through the power supply device 100 according to different exemplary embodiments via the first connection 106 and/or the second connection 108 and possibly interfering with the reception and/or transmission of data there. In other words, the power supply apparatus 100 may be considered to be a unidirectional coupler which enables a flow of energy from the chip card antenna 202 to the first circuit 208 and to the second circuit 210, but prevents energy in the form of (interference) currents or (interference) voltages being coupled back from the circuits to the chip card antenna 202. This unidirectional isolation or suppression function with respect to a flow of energy is substantially provided by the decoupling device 104.

Figure 3:
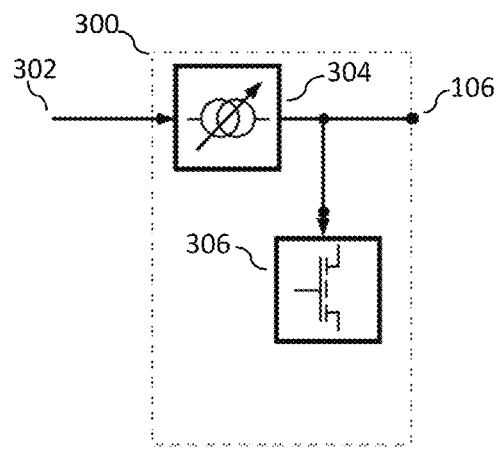
FIG. 3 shows a decoupling device according to different exemplary embodiments.

FIG. 3 shows a more detailed illustration of the decoupling device 300. In this case, only one circuit section belonging to one connection is illustrated, that is to say for example the current or voltage path between the input of the decoupling device 300 and one of the connections, for example the first connection 106. A corresponding circuit section may additionally be provided between the input of the decoupling device 104 and the further connection, for example the second connection 108 in the decoupling device 300. The circuit section between the input of the decoupling device 300 and the first connection 106 is described below.

The decoupling device 300 has an input path 302 which, in FIG. 1, corresponds to the link between the conversion device 102 and the decoupling device 104. The decoupling device 300 also has a DC source 304 which is connected between the input path 302 and the first connection 106. A transistor 306, for example a normally off MOSFET, is also connected between signal ground and the electrical path between the DC source 304 and the first connection 106.

The conversion device 102 provides the decoupling device 300 with a rectified voltage via the input path 302. In order to decouple the input path 302 from the first connection 106, the DC source 304 can be operated in a saturated state, in which case its drain-to-source voltage can be selected to be correspondingly high, for example at least 500 mV. In different exemplary embodiments, the decoupling device may be implemented by virtue of the fact that a backup capacitance is provided, which capacitance is charged, then is electrically disconnected from the input (for example by means of corresponding switches (switch transistor(s)) and is connected to the load (in other words the output) (for example also by means of corresponding switches (switch transistor(s)), and, after the load has discharged the required charge from the backup capacitance, the charge still remaining in the backup capacitance can be completely discharged or discharged to a predefined voltage level and can then be charged to the predefined level again by again being coupled to the input. In this manner, a predefined charge budget is therefore also charged and made available to the load irrespective of the actual charge consumption of the load (as long as the load does not require more charge than can be provided by the backup capacitance). Further exemplary embodiments may also provide for provided current to be discharged (clearly destroyed) by means of a current destruction circuit if no load is operated and, if a load is connected, for the current destruction circuit to be operated in such a manner that less current is discharged to the extent that current is removed from the load. A regulating circuit which is illustrated here in the simplest form using the transistor 306 and may possibly have further electronic components, for instance an operational amplifier which compares the voltage at the output of the DC source 306 with a reference voltage and accordingly drives the transistor 306, can be used to drop a shunt voltage across the transistor 306, and the load-independent and constant voltage provided at the first connection 106 may be kept at the value of the reference voltage. The decoupling device 300 may also have, for example, a capacitor which is coupled between signal ground and the electrical path between the DC source 304 and the first connection 106. In different exemplary embodiments, a constant power can be output at the connection 106 using the constant voltage source 304 and the voltage regulating element in the form of the transistor 306 irrespective of the external load connected to the first connection 106, the power requirement of the connected external load, for example of the first circuit 208, being able to be lower than the power supplied to the decoupling device 300 via the input path.

Figure 4:
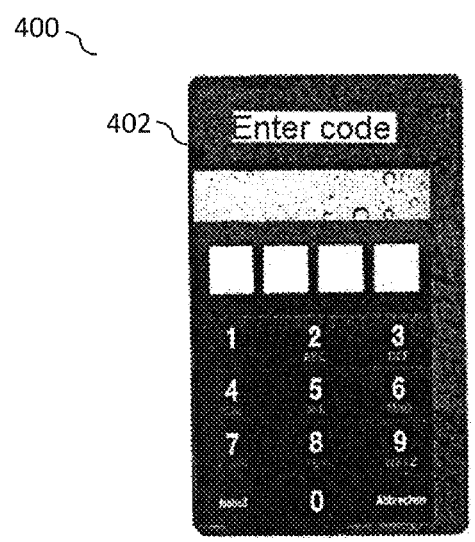
FIG. 4 shows a chip card according to different exemplary embodiments.

FIG. 4 illustrates a possible exemplary embodiment of the power supply apparatus according to different exemplary embodiments. In the exemplary application scenario shown there, the power supply apparatus according to different exemplary embodiments is arranged in a chip card 400 according to different embodiments. The chip card 400 has a touch-sensitive display 402 which may be arranged on the rear side of the chip card 400. If the chip card 400 is brought sufficiently close to a reading apparatus (not illustrated in FIG. 4), for example a payment terminal, the chip card antenna may couple to an electromagnetic field produced by the payment terminal, for example a wireless communication field, with the result that the chip card 400 is supplied with energy, on the one hand, on account of the high frequency of the electromagnetic field and the payment terminal can additionally transmit data to the chip card 400 using amplitude modulation. The chip card 400 may in turn transmit data to the payment terminal by means of load modulation of the electromagnetic field. The chip card 400 may correspond, for example, to the chip card 200 illustrated in FIG. 2. The first circuit 208 which can be supplied with energy via the first connection 106 may correspond in this case to the circuit which is arranged on the chip card module and has, for example, the chip card chip or chip card microcontroller together with further components such as memory modules and/or logic modules. The second circuit 210 which can be supplied with energy via the second connection 210 may have the touch-sensitive display 402 and an associated control circuit. The touch-sensitive display can be supplied with energy via the wireless communication field of the payment terminal, just like the chip card itself and thus also the first circuit and the second circuit. The power supply apparatus may prevent the touch-sensitive display 400 from impairing the interchange of data between the chip card 400 and the payment terminal during operation as a result of noise.

The chip card 400 according to different exemplary embodiments, as is illustrated in FIG. 4, makes it possible, for example, to input an item of information deserving protection directly on the chip card 400, for example a PIN code which identifies the user as the legitimate or authorized user. The information deserving protection therefore need not be input on an external input device, for instance the keypad of the payment terminal, and the risk of the user providing a manipulated external input device with his information deserving protection, as a result of which this information can be spied out, can therefore be considerably reduced in the scenario just described. After the information deserving protection has been input, this information can be transmitted to the payment terminal using the communication interface 204 and the chip card antenna 202, for example in encrypted form, in order to ensure tap-proof transmission. The payment terminal may likewise transmit its data to the chip card 400 in encrypted form. For example, an entire money withdrawal or money transfer transaction which can be initiated by a user on a payment terminal can also be entirely carried out without direct interaction between the user (or customer) and the payment terminal since the user can make all inputs on the touch-sensitive display 402 of the chip card 400. Such movement of the interaction from the payment terminal as the external device to the chip card in the possession of the user can considerably reduce the risk of data espionage further.

It should be emphasized that the scenario just described is not only restricted to payment methods but rather can be used in all areas where a chip card is used as identification means in conjunction with the input of an item of information deserving protection. Furthermore, a pattern-recognizing sensor or detector may also be integrated in the chip card according to different exemplary embodiments, with the result that a user can be unambiguously identified as the legitimate or authorized user on the basis of his physical features such as voice, fingerprint, facial features or eyes in conjunction with the chip card according to different exemplary embodiments. The functions just listed may be implemented using circuits which can be supplied with energy via the second connection 210, the power supply apparatus according to different exemplary embodiments being set up to suppress a possible effect of currents or voltages from the first circuit and/or from the second circuit on the chip card antenna and/or the circuit section relating to data communication. This makes it possible to suppress interference in the communication of data between the chip card according to different exemplary embodiments and a reading apparatus during operation of the additional components which are supplied with energy via the second connection.

Figure 5:
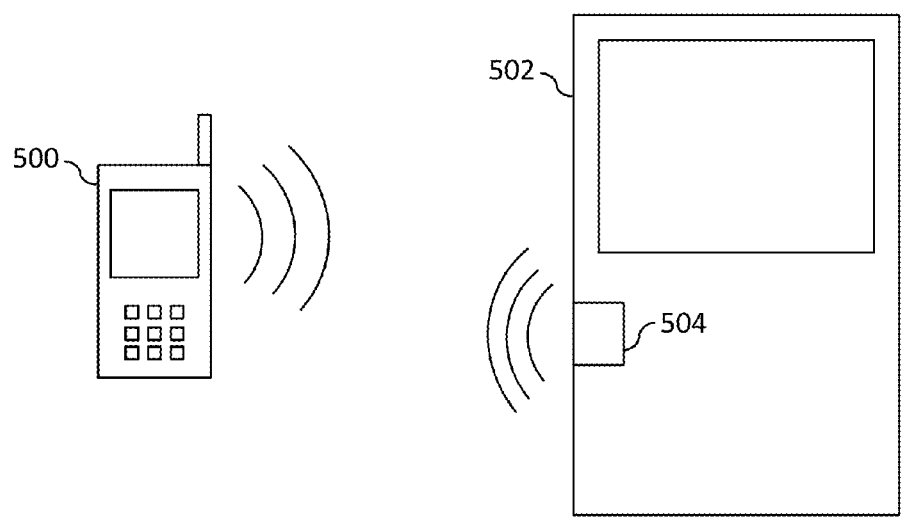
FIG. 5 shows an application scenario for the power supply apparatus according to different exemplary embodiments.

FIG. 5 illustrates another application scenario for the power supply apparatus according to different exemplary embodiments. In this example, the chip card with the power supply apparatus according to different exemplary embodiments installed therein is installed in a closing apparatus 504, for example a door lock 504 of a door 502. In this exemplary embodiment, the chip card may have one of the conventional formats, as specified further above, or alternatively its own format which is adapted to the closing apparatus 504. In the scenario illustrated in FIG. 5, a mobile radio device 500 assumes the role of a reading apparatus which produces an electromagnetic field which can transmit both energy and data to the chip card installed in the door lock 504. The wireless communication field provided by the mobile radio device 500 may be, for example, an NFC, a Bluetooth or an RFID field, for instance, or else an electromagnetic field of another frequency. If the mobile radio device 500 undershoots a predetermined distance from the door lock 504, the chip card provided in the door lock can be supplied with a sufficiently high voltage and can initiate its operation. Depending on the required security level, the locking system (that is to say the mobile radio device 500 and the door lock 504 provided with the chip card according to different embodiments) can be set up in such a manner that the mobile radio transmits an item of identification information to the chip card in the door lock 504, with the result that the door 502 is automatically locked or unlocked if the mobile radio device 500 exceeds or undershoots the predetermined distance from the door lock 504. However, the locking system may also be set up in such a manner that, after the mobile radio device 500 has transmitted the identification information to the door lock 504, the user is requested to input an item of information deserving protection on the mobile radio device 500 as soon as he enters a predetermined entry region of the door 502. Only after the user has been successfully identified is the door lock 504 locked or unlocked by providing energy at the second connection and supplying it to an actuator, for example an electric motor, or a relay. In this case, the energy needed to operate the door locking mechanism, which may have an electric motor for example, is provided from the wireless communication field of the mobile radio device 500 and can be made available to the door locking mechanism as the second circuit without feedback by the power supply apparatus inside the chip card according to different exemplary embodiments. The second circuit may also have a storage means, for example a capacitor, which is set up to buffer or store energy, as early as when the chip card in the door lock 504 is activated by a mobile radio device 500 brought sufficiently close thereto, in order to be able to cover a possibly increased energy requirement on account of the electric motor being activated in the event of the locking mechanism having to be activated for the purpose of locking or unlocking the door 502.

It is pointed out that, instead of a mobile radio device 500, it is possible to use other apparatuses which are accordingly set up and are able to produce a wireless communication field and are possibly also set up to receive user inputs. The application example on the chip card side is likewise not restricted to the door 502, but rather can be implemented in any desired apparatuses which are intended to carry out an action in an event-based manner. The event may be, for example, the detection of an apparatus which produces a wireless communication field and is brought sufficiently close to the chip card, with the result that an amount of energy sufficient to operate the chip card can be supplied to the latter.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:
1. A chip card comprising:
an antenna;
a power supply apparatus for providing a voltage from an electromagnetic field, comprising:
a conversion device configured to derive a voltage from a wirelessly received electromagnetic field; wherein the conversion device is configured to convert an AC voltage to a DC voltage;

a decoupling device coupled to the conversion device and configured to receive a derived voltage from the conversion device; and wherein the decoupling device comprises a first connection and a second connection;

wherein the first connection and the second connection are configured to receive the derived voltage, and wherein energy from the first connection and/or the second connection does not influence the power supply apparatus; and a communication interface; wherein the antenna is coupled to the communication interface, wherein a first circuit and a second circuit are coupled to the communication interface, wherein the first connection is coupled to the first circuit, wherein the second connection is coupled to the second circuit, and wherein the communication interface circumvents the power supply apparatus.

2. The chip card according to claim 1,
the chip card being set up as a contactless chip card.

3. The chip card according to claim 1,
a receiving apparatus being set up as a chip card antenna.

4. The chip card according to claim 1, further comprising:
a chip-card-internal circuit being coupled to the first connection.

5. The chip card according to claim 4,
the chip-card-internal circuit comprising a microprocessor.

6. The chip card according to claim 1, further comprising:
a chip-card-external circuit being coupled to the second connection.

7. The chip card according to claim 6,
the chip-card-external circuit comprising a display.

8. The chip card as claimed in claim 7,
the display being touch-sensitive.

9. The chip card according to claim 6,
the chip-card-external circuit comprising an actuator.

10. The chip card according to claim 9,
the electrical actuator comprising an electric motor which is set up to control a state of a lock.

11. The chip card according to claim 1, further comprising a chip-card-internal circuit being coupled to the first connection, a chip-card-external circuit being coupled to the second connection, and wherein the chip-card-external circuit and the chip-card-internal circuit are configured to communicate with a reading apparatus by means of the communication interface.

12. The chip card according to claim 11,
the reading apparatus comprising a mobile radio device.

13. The chip card according to claim 11,
the reading apparatus comprising a payment terminal.

14. The chip card according to claim 1, wherein the first circuit and the second circuit are configured for bidirectional communication with the antenna.

* * * * *